(12) United States Patent
Muppalla et al.

(10) Patent No.: US 8,483,129 B2
(45) Date of Patent: Jul. 9, 2013

(54) RTP VOICE PACKETS FOR BASE STATION HAND-OFF IN MOBILE IP TELEPHONY

(75) Inventors: Karthikeya V. Muppalla, Sunrise, FL (US); Shih-Chun Chang, Sunrise, FL (US); Shashidhar R. Gandham, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 863 days.

(21) Appl. No.: 12/590,469

(22) Filed: Nov. 9, 2009

(65) Prior Publication Data

US 2010/0124202 A1    May 20, 2010

Related U.S. Application Data

(60) Provisional application No. 61/199,478, filed on Nov. 17, 2008.

(51) Int. Cl.
*H04W 4/00* (2009.01)
*H04L 12/28* (2006.01)
*H04J 3/24* (2006.01)

(52) U.S. Cl.
USPC ............ 370/328; 370/331; 370/389; 370/349

(58) Field of Classification Search
USPC ......................................................... 370/328
See application file for complete search history.

(56) References Cited

U.S. PATENT DOCUMENTS

| 5,448,569 | A | 9/1995 | Huang et al. |
|---|---|---|---|
| 6,049,715 | A | 4/2000 | Willhoff et al. |
| 6,300,887 | B1 * | 10/2001 | Le .................................... 341/60 |
| 6,515,970 | B1 * | 2/2003 | Lindsay et al. ............... 370/280 |
| 7,061,936 | B2 | 6/2006 | Yoshimura et al. |
| 2006/0262788 | A1 * | 11/2006 | Johnson et al. ............... 370/389 |
| 2007/0223469 | A1 | 9/2007 | Chandra et al. |

* cited by examiner

*Primary Examiner* — Noel Beharry
(74) *Attorney, Agent, or Firm* — Dennis L. Cook, Esq.

(57) ABSTRACT

In wireless networks where the goal is to support a large number of VOIP based cellular calls, large overhead headers in RTP voice packets are not acceptable. In wireless networks where multiple base stations are deployed, handsets may handoff from one base station to the other while in a voice call creating a large overhead. This disclosure describes an efficient way to extend a header compression algorithm and lower the overhead when the handset is in a voice call and hands off from one base station to another.

1 Claim, 3 Drawing Sheets

Message sequence timeline (mobile wireless RTP for Intra-dealer Handoff)

FIGURE 1

Table Showing State Info packet Format (modified with Reverse StateInfo bit)

| Modified Control Message format – 8 bytes - ( sent with StateInfo Packet) | | | | | | | |
|---|---|---|---|---|---|---|---|
| 16 bits | 16 bits | 16 bits | 1 bit | 1 bit | 2 bits | 4 bits | 8 bits |
| UDP Source port | UDP Destination port | RTP Sequence Number | RTP Padding | Reverse StateInfo bit | Reserved | Message Type = 6 (for StateInfo) | Length |

| StateInfo – 12 bytes | | |
|---|---|---|
| 32 bits | 32 bits | 32 bits |
| IP address | RTP Time Stamp | RTP SSRC |

FIGURE 2

Table Showing ACKStateInfo packet Format (modified with Reverse ACKStateInfo bit)

| Modified Control Message ( ACK StateInfo) format – 8 bytes | | | | | |
|---|---|---|---|---|---|
| 32 bits | 16 bits | 3 bits | 1 bit | 4 bits | 8 bits |
| Not Used | ACK Information (RTP Sequence Number present in the StateInfo packet received) | Reserved | Reverse ACKStateInfo bit | Message Type = 7 (for ACKStateInfo) | Length |

Message sequence timeline (mobile wireless RTP for Intra-dealer Handoff)

RTP VOICE PACKETS FOR BASE STATION HAND-OFF IN MOBILE IP TELEPHONY

CROSS-REFERENCE TO RELATED APPLICATION

The present application claims the benefit of previously filed co-pending Provisional Patent Application Ser. No. 61/199,478.

FIELD OF THE INVENTION

This invention addresses the need to transport high bit-rate data and voice to multiple users over wired and wireless means. In wireless networks where multiple base stations are deployed, handsets may handoff from one base station to the other while in a voice call. In this disclosure an efficient way to extend the header compression algorithm for RTP packets when the handset is in voice call and hands off from one base station to another is described.

BACKGROUND OF THE INVENTION

The invention disclosed in this application uses any integer cycle or impulse type modulation and more particularly is designed to work with a method of modulation now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this efficient way to extend the header compression algorithm for RTP packets when the handset is in a voice call and hands off from one base station to another is disclosed in the preferred embodiment as being used in these types of integer cycle and pulse modulation systems it can be implemented on any of the broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos.: 12/069,057; 12/070,815; 12/380,698; 12/384,546; 12/386,648; 12,387,811; 12/387,807, 12/456,758, 12/456,725, 12/460,497, 12/583,627, 61/583,644, and 61/198,782 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of an efficient way to extend the header compression algorithm for RTP packets when the handset is in a voice call and hands off from one base station to another as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

The overhead of IP+UDP+RTP headers in RTP voice packets is 200% (using G.723.1 codec with a 30 ms packetization interval at 5.3 Kbps). In wireless networks where the goal is to support a large number of VOIP based cellular calls, an overhead of 200% is not acceptable. A header compression mechanism, which reduces this overhead to 15%, is disclosed in application Ser. No. 12/386,648 by Karthikeya V. Muppala and Shashidhar Gandham mentioned above and incorporated herein. In wireless networks where multiple base stations are deployed, handsets may hand off from one base station to the other while in a voice call. In this invention disclosure an efficient way to extend the header compression algorithm when the handset is in a voice call and hands off from one base station to another is described.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which:

FIG. 1 is a table showing a StateInfo packet format;
FIG. 2 is a table showing a StateInfo packet format; and,
FIG. 3 is a diagram showing message flow.

DETAILED DESCRIPTION OF THE INVENTION

Figure 3:
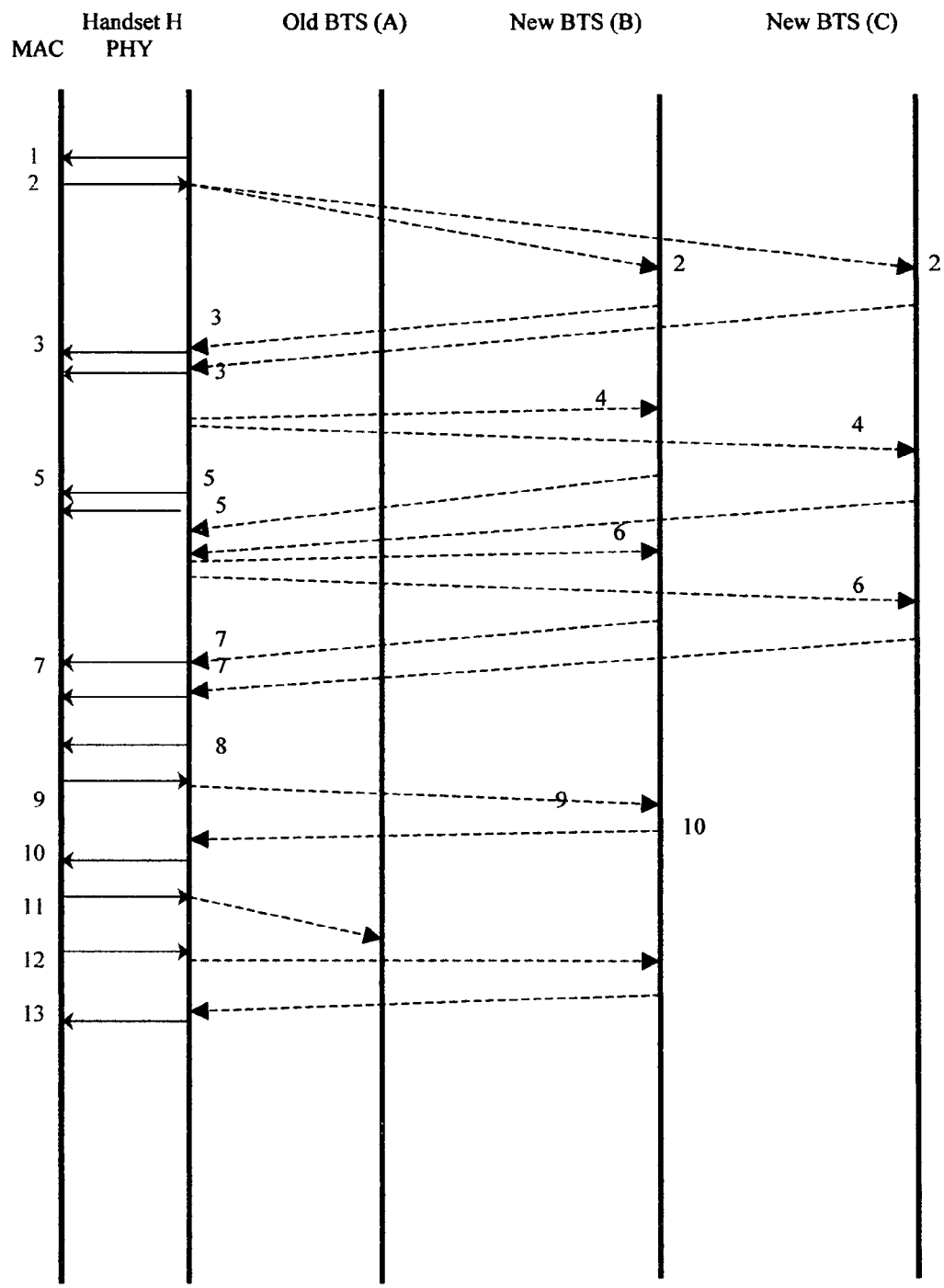

The application, Header compression mechanism for transmitting RTP packets over wireless links, Ser. No. 12/386,648 by Karthikeya V. Muppala and Shashidhar Gandham, discloses a header compression and decompression mechanism employed between a handset and a base station. The algorithm does not account for the case where the handset moves from one base station to another base station during a voice call. The header compression algorithm is a state-full algorithm. The new base station does not have the state information of the header compression/decompression pertaining to handset (which just did the handoff) with the old base station. This state information needs to be communicated to the new base station for successful compression/decompression of the RTP voice packets during and after a handoff procedure. This application discloses a solution addressing this problem.

In the current discussion xMAX is used as a preferred embodiment wireless network and the heterogeneous MAC protocol described above as a preferred embodiment protocol. Details can be found in the applications referenced above. Consider multiple base stations covering a geographical area. Let a handset H that is in a voice call be associated with base station A. During the voice call assume the handset H moves to a place where it receives a stronger signal (relative to the signal strength from base station A) from two other base stations, say B and C. This will initiate the handoff procedure for the handset H as it listens to beacons from the two other base stations B and C in addition to the weaker signal from base station A. During this time the handset H acquires provisional timeslots from the new base station. Until the handset hands off to a new base station it will have the timeslot assigned by the old base station A.

Provisional timeslot assignment and proactive scanning mechanisms are described in the application Ser. No. 12/387,807, Provisional Handoff Mechanism in a Heterogeneous MAC Protocol for Wireless Networks by Amit Shukla and Shashidhar Gandham. Relevant details to the scope of this document are discussed here. The Provisional Handoff Mechanism is a handoff mechanism that does not require any inter-BTS communication. The mechanism makes use of proactive scanning to create a list of base stations (BTSs) that have an acceptable RSSI value. Proactive scanning is a technique where a handset proactively monitors BTSs in its vicinity. In each scan, the mobile will collect RSSI values and store them in a cache. Based on the measurements made during proactive scanning, the handset may make a decision regarding when to perform a handoff. It may then request timeslots from multiple BTSs (which are in reception range) while maintaining its current connection. The new BTSs will assign provisional Uplink and Downlink timeslots (if available) to the handset.

The conditions under which a StateInfo packet is triggered at the compressor end are discussed in the Header Compression Mechanism For Transmitting RTP Packets Over Wireless Links application mentioned above. The mobile wireless RTP solution discussed here requires a StateInfo packet to be sent during a provisional timeslot as part of the handoff procedure. During the handoff procedure, the handset H acquires provisional timeslots from base stations B and C. When a new base station B or C assigns a provisional timeslot to a handset H, the compression and decompression states at the respective base stations are initialized.

The handset always stores a copy of the most recent StateInfo packet sent to the base station A. The handset sends this StateInfo packet to base stations B and C during its provisional timeslot assigned by the respective base stations. As described in the previous application every StateInfo packet sent by the compressor must be acknowledged by the decompressor at the receiving end. This ensures that the handset delivers the StateInfo packet reliably to the new base stations (B and C) during its provisional timeslots allotted by the respective base stations.

Once the handset acquires a permanent timeslot from either of the new base stations (B or C), it starts sending compressed RTP in the permanent timeslot to the new base station. Suppose the handset H hands off to the new base station B. The new base station B can decompress the compressed RTP packets correctly because the decompressor at the base station B has already been initialized when it assigned the provisional timeslot to the handset H and also the StateInfo was already received by the new base station B in the provisional timeslot for handset H.

The new base station can forward RTP packets to the handset once it assigns a permanent timeslot to handset H which is in a voice call. When the new base station B gets the first RTP voice packet (from the Internet) destined to handset H, the compressor at the base station B sends a StateInfo packet to handset. For all the following RTP voice packets that the base station B receives from the Internet destined to handset H, the base station B sends compressed RTP which will be decompressed at the handset.

During the provisional timeslot the handset will send the most recent StateInfo that it had received from the base station A, to base station B. This is different from the StateInfo that the compressor at the handset H sends to base station B. We call the former StateInfo packet a reverse StateInfo because it is the packet which was generated at base station A, but sent to base station B via handset H. This reverse StateInfo is acknowledged with a reverse ACKStateInfo by the base station B to handset H. Note that instead of the base station establishing the state information the handset establishes it proactively during the handoff process.

When the handset H handoffs to a base station that belongs to a different dealer's network (inter-dealer handoff), the handset gets a new IP address from the new base station. As the handset's IP address changes, it generates a SIP RE-INVITE that is sent to the base station. The handset then sends a StateInfo to the base station that acknowledges back with an ACK StateInfo. For the subsequent RTP Voice packets generated at the handset, it starts sending compressed RTP packets to the base station. Hence, for the duration of the time that it takes the SIP RE-INVITE message to be delivered to the other end from the handset, there will not be any voice traffic from the handset.

On the other hand, when the new base station gets the first RTP voice packet from the Internet destined for the handset H, the base station sends a StateInfo to the handset which acknowledges back with an ACK StateInfo. For the subsequent RTP voice packets received at the base station, the base station sends compressed RTP packets to the handset.

The formats of reverse StateInfo and reverse ACKStateInfo are shown in FIGS. 1 and 2. The 4-bit reserved field in the modified control message is used to carry this information.

Reverse StateInfo is always sent by the handset to the new base station during handoff if the handset is in a voice call. The new base station differentiates between the normal StateInfo (generated for the RTP packets originating at handset) and the reverse StateInfo packet, by using a reverse StateInfo bit. A '1' in the reverse StateInfo bit indicates that the packet is a reverse StateInfo packet. Similarly the reverse ACKStateInfo is always sent as a response to the reverse StateInfo by the new base station to the handset. A '1' in the reverse ACKStateInfo bit indicates that the packet is a reverse ACKStateInfo packet. Now that the new base station B knows the StateInfo used by base station A, it will successfully compress the RTP packets it receives from the SIP proxy destined to handset H. The decompressor at the handset will decompress the packets normally.

FIG. 3, shows the message exchanges in this mobile wireless RTP solution and uses the following message definitions:

Message Definitions:

| 1 | Approaching Handoff trigger | 2 | Provisional timeslot assignment request |
|---|---|---|---|
| 3 | Provisional timeslot assignment reply | 4 | State Info |
| 5 | ACK State Info | 6 | Reverse State Info |
| 7 | Reverse ACK State Info | 8 | Imminent Handoff trigger |
| 9 | Handoff Confirm | 10 | Handoff Confirm Ack |
| 11 | Connection break | 12 | Compressed RTP |
| 13 | Compressed RTP | | |

This mobile wireless RTP solution discusses the changes to the original header compression algorithm described in the previously filed application described above. This invention enables a handset in a voice call to move across multiple base stations without having to drop the voice call (intra-dealer or inter-dealer handoff). This solution discusses changes in the header formats of StateInfo and ACK StateInfo packets and also how the provisional timeslots assigned by the new base station to the handset that is handed off are utilized to communicate StateInfo and ACK StateInfo packets. The solution also preserves the correctness of the original header compression algorithm.

What is claimed is:

1. A header compression method for a medium access control protocol used for forwarding Internet Protocol packets between multiple base stations and mobile nodes during mobile node hand-off between base stations in voice over the Internet protocol systems on a wireless network comprising:

multiple base stations in electrical communication with the Internet;

one or more mobile nodes in wireless electrical communication with one of said multiple base stations and each of said one or more mobile nodes and multiple base stations having a compressor and a decompressor;

said multiple base stations and said one or more mobile nodes each having a medium access control protocol;

each of said multiple base stations transmitting a beacon signal;

said medium access control protocol having superframes containing headers that contain voice traffic Internet Protocol packets, signaling traffic Internet Protocol packets, and application data traffic Internet Protocol packets;

wherein each of said Internet Protocol packets forwarded and received from said base station from the Internet has uncompressed headers that contain fields;

wherein said voice traffic Internet Protocol packets are identified;

wherein said voice traffic Internet Protocol packets are not fragmented;

wherein said headers are compressed or decompressed on both said multiple base stations and said one or more mobile nodes by said compressors and decompressors;

wherein said headers compression or decompression is applied only to said voice traffic Internet Protocol packets;

said fields of said headers being categorized as never transmitted where said fields are constant, periodically transmitted where said fields periodically change, or always transmitted where said fields change with each of said Internet Protocol packets;

wherein said fields of said headers in the never transmitted fields can always be compressed and decompressed;

wherein said fields of said headers in the always transmitted fields are never compressed and decompressed;

wherein when a change occurs in said fields of said headers in the periodically transmitted fields being sent from said base station or said one or more mobile nodes a stateinfo packet indicating all information contained in said periodically transmitted fields is always sent in place of voice information in said voice traffic Internet Protocol packet, an acknowledge packet is sent in reply, all information in said fields is stored in said base station and said one or more mobile nodes and header compression begins and continues by transmitting a compressed version of the stored fields information until the next change occurs;

wherein said medium access control protocol having superframes containing headers contain provisional time slots dedicated to handing off a mobile node between a current base station a mobile node is in wireless electrical communication with and a replacement base station;

wherein when said mobile node detects a threshold minimum signal strength from said current base station said mobile node scans for received signal strength indicators from said beacons of other said multiple base stations in said mobile nodes' electrical communication range and said mobile node stores said received signal strength indicators of said multiple base stations;

wherein when said mobile node detects an additional threshold minimum signal strength from said current base station it sends a provisional handoff request to a replacement base station that has the strongest stored received signal strength indicator;

wherein said replacement base station receiving said provisional handoff request assigns provisional time slots to said mobile node that sent said provisional handoff request to said replacement base station;

wherein if said mobile node receiving said provisional time slots from said replacement base station is in a voice call said mobile node sends to said replacement base station all information in said fields that was stored by said mobile node using said provisional time slots such that compression can begin; and wherein when said mobile node detects a final threshold minimum signal strength from said current base station it sends a handoff confirm message using said provisional time slots to said replacement base station beginning wireless electrical communication with said replacement base station and also sends a connection break-off message to said current base station breaking off wireless electrical communications with said current base station.

* * * * *